United States Patent
Knjazihhin et al.

(10) Patent No.: US 9,781,102 B1
(45) Date of Patent: Oct. 3, 2017

(54) MANAGING SUPPORT ACCESS IN SOFTWARE-AS-A-SERVICE SYSTEMS (71) Applicant: EMC Corporation, Hopkinton, MA (US)

(72) Inventors: Denis Knjazihhin, Brighton, MA (US); Joseph Xavier Lawrence, Jr., East Boston, MA (US); David Shapiro, Waltham, MA (US); Dan Uwe Zehme, Medfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 14/200,572

(22) Filed: Mar. 7, 2014

Related U.S. Application Data (60) Provisional application No. 61/774,611, filed on Mar. 8, 2013.

(51) Int. Cl.
H04L 29/06 (2006.01)

(52) U.S. Cl.
CPC .................. H04L 63/083 (2013.01)

(58) Field of Classification Search
CPC ............... H04L 63/083; H04L 63/0838; H04L 63/0846
See application file for complete search history.

(56) References Cited

U.S. PATENT DOCUMENTS

| 6,449,651 | B1 * | 9/2002 | Dorfman et al. ............. 709/229 |
| 7,185,194 | B2 * | 2/2007 | Morikawa ............. H04L 9/3213 713/156 |
| 7,401,133 | B2 | 7/2008 | Huang et al. |
| 8,166,310 | B2 * | 4/2012 | Harrison et al. .............. 713/184 |
| 8,635,152 | B2 * | 1/2014 | Das et al. ........................ 705/39 |
| 8,635,673 | B2 | 1/2014 | Anand et al. |
| 2003/0014557 | A1 * | 1/2003 | Berger et al. ................. 709/318 |
| 2003/0172287 | A1 * | 9/2003 | Bailo et al. .................... 713/193 |
| 2005/0132231 | A1 * | 6/2005 | Williamson et al. ......... 713/201 |
| 2007/0162963 | A1 * | 7/2007 | Penet ...................... G06F 21/41 726/5 |
| 2007/0300179 | A1 * | 12/2007 | Friedlander ................... 715/781 |
| 2013/0232482 | A1 | 9/2013 | Hassan et al. |
| 2013/0239166 | A1 * | 9/2013 | MacLeod et al. ................ 726/1 |
| 2014/0059651 | A1 * | 2/2014 | Luster et al. ..................... 726/4 |
| 2014/0075031 | A1 * | 3/2014 | Doering et al. ............. 709/226 |

* cited by examiner

*Primary Examiner* — Saleh Najjar
*Assistant Examiner* — Louis Teng
(74) *Attorney, Agent, or Firm* — BainwoodHuang (57) ABSTRACT

An improved technique involves setting an administrator password in a server to a temporary password upon receipt of a request for administrator access to the server. Along these lines, when a support engineer receives a support ticket from a customer, the support engineer sends a request to obtain administrator access to the customer's server to an access control computer. The access control computer, upon receipt of the request, generates a temporary password that grants the support engineer a one-time administrator access to the server. The access control computer then changes the administrator password on the server to the temporary password and reveals the temporary password to the support engineer. At some time either after the engineer obtains administrator access to the server or after some specified time has passed, the access control computer invalidates the temporary password by changing the administrator password to a different password.

15 Claims, 6 Drawing Sheets

MANAGING SUPPORT ACCESS IN SOFTWARE-AS-A-SERVICE SYSTEMS

CROSS REFERENCE TO RELATED APPLICATIONS

This Patent Application is a Non-provisional utility application which claims the benefit under 35 U.S.C. §119(e) from U.S. Provisional Patent Application No. 61/774,611 filed on Mar. 8, 2013, entitled, "SECURELY MANAGING SUPPORT ACCESS TO APPLICATION INSTANCES IN SOFTWARE AS A SERVICE APPLICATIONS", the contents and teachings of which are herein incorporated by reference in their entirety.

BACKGROUND

Software-as-a-service (SaaS) is a software delivery model in which a software vendor provides a single system—a SaaS system—that provides a software application service to multiple customers through the cloud. Typically, the software application is a business application and each customer represents a business or other organization. Members of an organization access the software application service from servers that host the software application.

Some conventional SaaS systems provide the software application to each customer on a separate server. For example, consider such a SaaS system that provides an email application to a company with a large number of employees. In this case, the software vendor provides the company with its own server. Each employee of the company accesses the email application from this server on his or her desktop computer using a web browser.

A software vendor providing a conventional SaaS system to a customer typically offers support to the customer in the form of a team of support personnel. The support personnel perform support tasks in response to support tickets submitted by the customer. In performing a support task, a support person logs into the customer's server and makes changes to server settings appropriate to the support task.

SUMMARY

Unfortunately, there are deficiencies with the above-described conventional SaaS systems. For example, in a conventional SaaS system, each support person may become able to make changes to server settings by obtaining administrator access to the customer's server. The support person obtains administrator access using an administrator password for that server. The administrator password is shared among the team so that any support person may perform support tasks on the server. Security problems may arise, however, because the SaaS system does not identify a support person when logged into a server. Rather, the support person is identified only as an "administrator" when accessing the server. In essence, a disgruntled support person may use his or her knowledge of the administrator passwords on the servers of a SaaS system to wreak havoc without being detected.

One remedy to this deficiency might seem to involve providing each support person with his or her own unique password for each server. For example, on each server there may be a table of identifiers, each of which identifies a support person, as well as a corresponding password giving that support person administrator access to the server. While this remedy seems to provide a way to identify which person has logged into a server, the accumulation of multiple passwords introduces significant password management problems and costs to the support function. For example, an administrator must expire the passwords for each support person that leaves the team.

In contrast to the above-described conventional SaaS system that may result in either insufficient security or too much management complexity, an improved technique involves setting an administrator password in a server to a temporary password upon receipt of a request for administrator access to the server. Along these lines, when a support engineer receives a support ticket from a customer, the support engineer sends a request to obtain administrator access to the customer's server to an access control computer. The access control computer, upon receipt of the request, generates a temporary password that grants the support engineer a one-time administrator access to the server. The access control computer then changes the administrator password on the server to the temporary password and reveals the temporary password to the support engineer. At some time either after the engineer obtains administrator access to the server or after some specified time has passed, the access control computer invalidates the temporary password by changing the administrator password to a different password.

Advantageously, the improved technique provides secure administrator access to customers' servers in a SaaS system without requiring complex password management. Because the request for access comes from a support engineer, the access control device may associate the generated password with that engineer in an audit log. If or when that engineer obtains administrator access to the server using the generated password, the server may also log the access in another log that identifies the engineer. Further, once the access is obtained, the server may contact the access control device so that the device may change the administrator password on the server to a different password. In this way, security is established because the engineer may not use the generated password again and the engineer knows that his or her activity has been logged.

One embodiment of the improved technique is directed to a method of operating a computing device configured to manage a SaaS system. The method includes receiving, by the computing device from a user, a request to obtain administrator access to a server of the SaaS system. The method also includes generating, by the computing device, a temporary password in response to receipt of the request. The method further includes setting, by the computing device, the administrator password of the server to the temporary password. The method further includes revealing, by the computing device, the temporary password to the user, the temporary password enabling the user to obtain administrator access to the server. The method further includes changing, by the computing device, the administrator password from the temporary password to a different password once a specified amount of time has elapsed after the temporary password is revealed to the user.

Additionally, some embodiments of the improved technique are directed to an apparatus constructed and arranged to manage a SaaS system. The apparatus includes a network interface, memory, and a controller including controlling circuitry constructed and arranged to carry out the method of operating a computing device configured to manage a SaaS system.

Furthermore, some embodiments of the improved technique are directed to a computer program product having a non-transitory computer readable storage medium that stores code including a set of instructions which, when executed by a computer, cause the computer to carry out the method of operating a computing device configured to manage a SaaS system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves setting an administrator password in a server to a temporary password upon receipt of a request for administrator access to the server. Along these lines, when a support engineer receives a support ticket from a customer, the support engineer sends a request to obtain administrator access to the customer's server to an access control computer. The access control computer, upon receipt of the request, generates a temporary password that grants the support engineer a one-time administrator access to the server. The access control computer then changes the administrator password on the server to the temporary password and reveals the temporary password to the support engineer. At some time either after the engineer obtains administrator access to the server or after some specified time has passed, the access control computer invalidates the temporary password by changing the administrator password to a different password.

Figure 1:
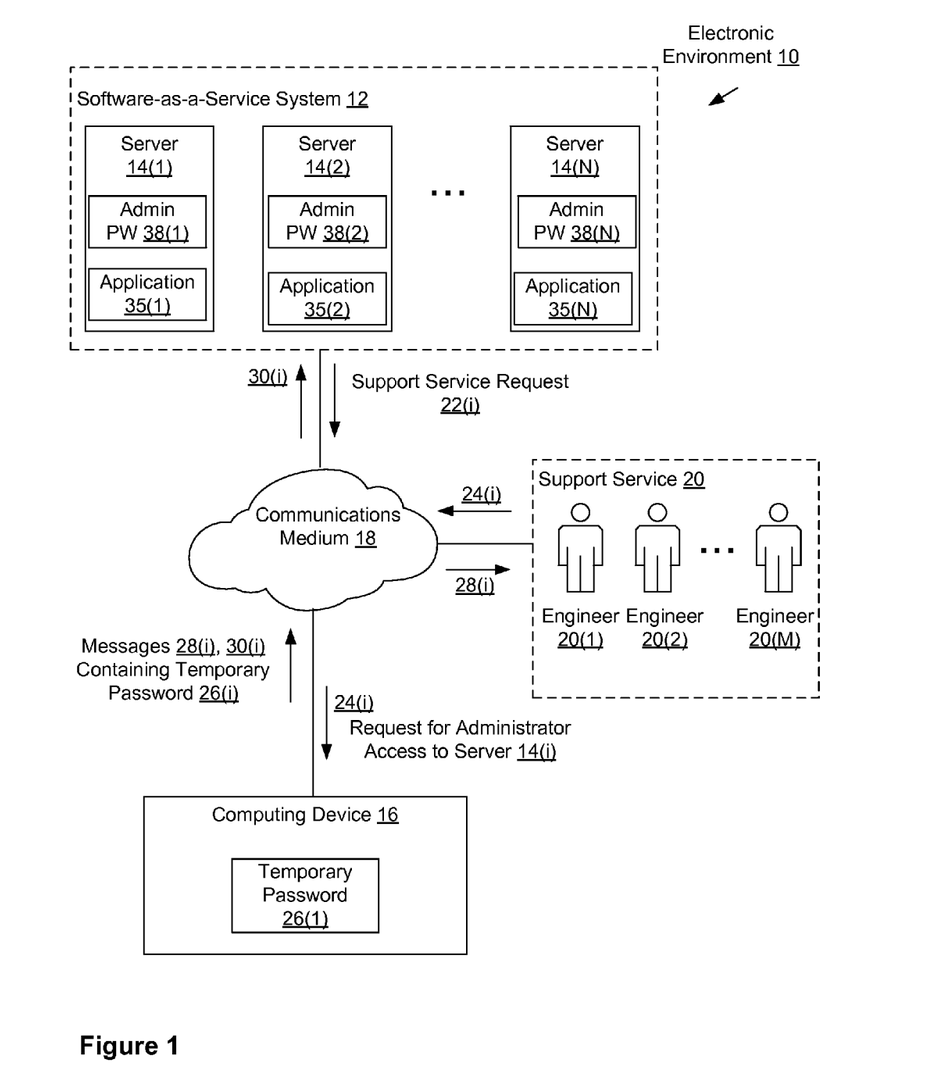
FIG. 1 is a block diagram illustrating an example electronic environment for carrying out the improved technique.
Figure 2:
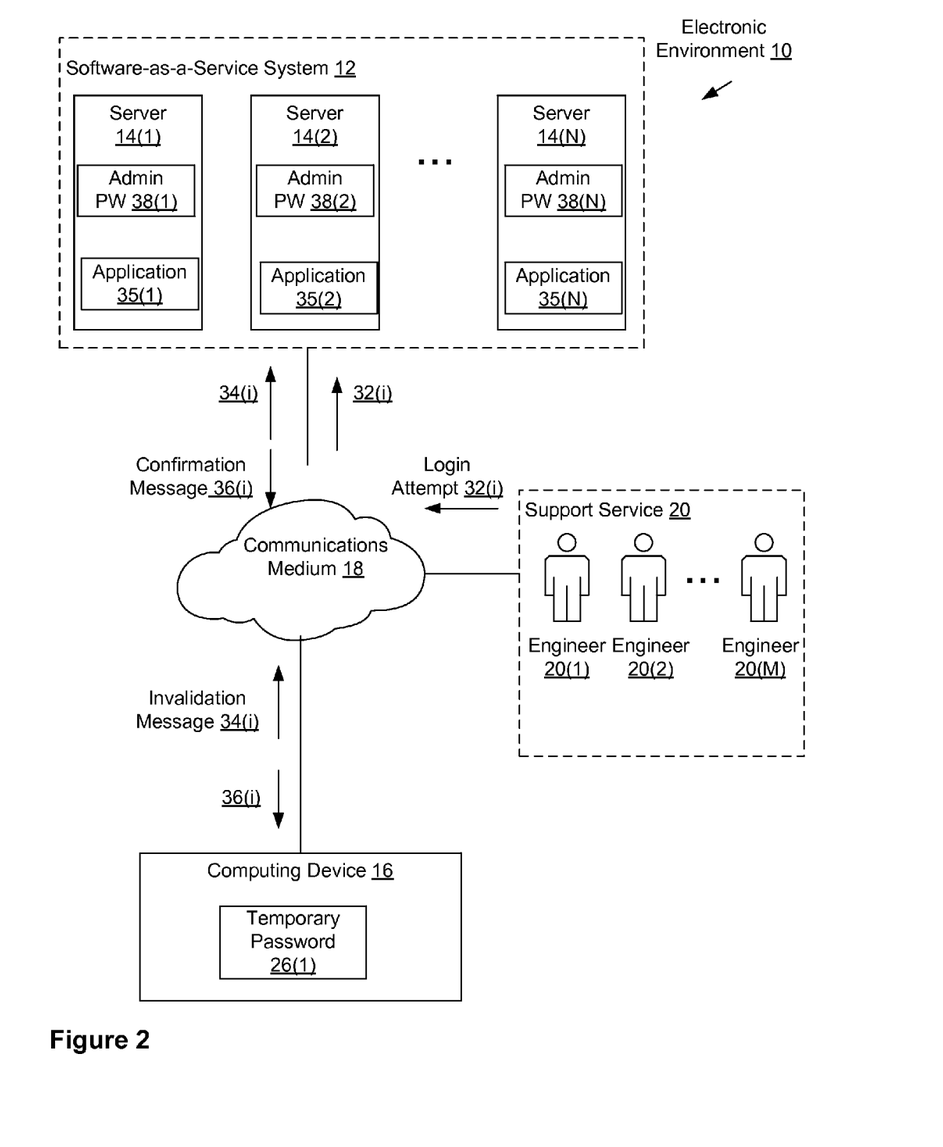
FIG. 2 is a block diagram further illustrating the example electronic environment for carrying out the improved technique.

FIGS. 1 and 2 illustrate an example electronic environment 10 for carrying out the improved technique. Electronic environment 10 includes software-as-a-service (SaaS) system 12, computing device 16, communications medium 18, and support service 20.

SaaS system 12 is configured to provide a software application service to multiple customers through the cloud. SaaS system 12 includes multiple servers 14(1), 14(2), ..., 14(N), where N is the number of servers in SaaS system 12.

Each server, say, 14(j) (j being between 1 and N), is configured to host an instance of a software application for a customer. For example, server 14(j) has a particular configuration of the software application that conforms to specific requirements of the customer. Server 14(j) includes processing circuitry and memory sufficient to host the software application, and a network interface that allows communication with clients of the customer. Server 14(j) is also configured to provide certain users having knowledge of an administrator password 38(j) with administrator access. Administrator access enables these users to perform support operations on behalf of the clients. Server 14(j) is further configured to communicate with computing device 16 when an engineer 20(i) obtains administrator access.

Computing device 16 acts as an access control device that is constructed and arranged to generate a temporary password 26(i) upon receipt of a request 24(i) for administrator access to server 14(j). Computing device 16 is also constructed and arranged to associate a temporary password 26(i) with an engineer 20(i). Computing device 16 is further constructed and arranged to send messages 28(i) and 30(i) to server 14(j) and engineer 20(i) revealing temporary password 26(i). In some arrangements, computing device 16 is itself a SaaS server that hosts a software application for granting administrator access to server 14(j). In other arrangements, however, computing device 16 is configured to communicate with engineer 20(i) via email.

Communications medium 18 provides network connections between SaaS system 12, computing device 16, and support service 20. Communications medium 18 may implement a variety of protocols such as TCP/IP, UDP, ATM, Ethernet, Fibre Channel, combinations thereof, and the like. Furthermore, communications media 44 may include various components (e.g., cables, switches/routers, gateways/bridges, NAS/SAN appliances/nodes, interfaces, etc.). Moreover, communications medium 18 is capable of having a variety of topologies (e.g., queue manager-and-spoke, ring, backbone, multi drop, point to-point, irregular, combinations thereof, and so on).

Support service 20 includes multiple support engineers 20(1), 20(2), ..., 20(M), where M is the number of support engineers in support service 20. Each support engineer 20(i) may be trained to provide support services on any of the servers 14(1), 14(2), ..., 14(N).

During an example operation, an engineer 20(i) receives support service request 22(i) from a customer using server 14(j). For example, support service request 22(i) may take the form of a computer-generated ticket that describes a problem that a client has had in using the software application.

After receiving support service request 22(i), engineer 20(i) sends a request 24(i) for administrator access to server 14(j) to computing device 16 through communications medium 18. Along these lines, engineer 20(i) produces request 24(i) using a web browser running on a thin client. The software application running in the web browser provides engineer 20(i) with a field for identifying server 14(j) to be serviced and a button for sending request 24(i) to computing device 16. Further, the software application provides a place for engineer 20(i) to log in so that engineer 20(i) may be identified when sending request 16. In this case, request 24(i) contains an identifier for both engineer 20(i) and server 14(i).

Computing device 16 receives request 24(i) over communications medium 18. After computing device receives request 24(i), computing device generates a temporary password 26(i). Computing device 16 generates password 16(i) based on the fact that engineer 20(i) has presumably logged in using a valid identifier and is therefore properly identified as authorized to obtain administrator access to server 14(i). In some arrangements, computing device 16 keeps a list of servers for which an engineer, say 20(j), is authorized to obtain administrator access.

It should be understood that temporary password 26(i) will only be able to be used by engineer 20(i) at most once. In some arrangements, however, computing device 16 may allow engineer 20(i) multiple, but a finite number of, administrator accesses to server 14(i).

It should also be understood that, in some arrangements, computing device 16 generates temporary password 26(i) using a pseudo-random or random number generator that outputs some number of ASCII characters, say, 24 characters. In other arrangements, however, computing device 16 may generate password 26(i) based on, e.g., a table of passwords or a deterministic computation scheme.

After computing device 16 generates password 26(i), computing device 16 sends a message 30(i) to server 14(j) containing a command to change administrator password 38(j) to temporary password 26(i). In some arrangements, computing device 16 possesses a "super-administrator" account on all servers 14(1), 14(2), . . . , 14(N) that allows computing device 16 to change other administrator passwords via a message such as message 30(i).

In some arrangements, server 14(j) sends a confirmation message 36(i) to computing device 16 to confirm that the administrator password is now temporary password 26(i). Once computing device 16 receives confirmation message 36(i), computing device 16 reveals temporary password 26(i) to engineer 20(i) within message 28(i) via communications medium 18. In other arrangements, however, computing device 16 reveals temporary password 26(i) to engineer 20(i) within message 28(i) upon generating temporary password 26(i) without responding to a confirmation message from the server.

In some arrangements, computing device 16 sends a message 30(i) to server 14(j) containing a command to create an administrative user account. Computing device 16 deletes the administrative user account as part of the password expiration procedure.

In some arrangements, when computing device 16 is itself a SaaS server, engineer 20(i) sees temporary password 26(i) displayed within a browser window. This browser window may be the same browser window from which engineer 20(i) initiated request 24(i).

As illustrated in FIG. 2, in some arrangements, engineer 20(i) attempts to obtain administrator access to server 14(j) by sending a login attempt 32(i) to server 14(i). Login attempt 32(i) may take the form of a communication between the thin client used by engineer 20(i) and a virtual machine representing server 14(j) running on the thin client.

In this case, once engineer 20(i) successfully logs into server 14(i), server 14(j) sends another message 36(i) to computing device 16 confirming that engineer 20(i) has obtained administrator access to server 14(i). Once computing device 16 receives this message 36(i), computing device 16 sends an invalidation message 34(i) containing a command to change administrator password 38(j) to a different password.

In other arrangements, however, engineer 20(i) may not make an attempt to obtain administrator access to server 14(i). In this case, computing device 16 may send invalidation message 34 to server 14(j) after a specified amount of time has passed, e.g., 2 hours, 1 hour, 30 minutes, 15 minutes, or the like. Alternatively, computing device 16 may also receive a message from server 14(j) after the specified amount of time stating that no login attempts have been made since administrator password 38(j) was changed; in this case, computing device 16 may send invalidation message 34 to server 14(j) after receiving this message.

It should be understood that in either scenario, whether engineer 20(i) successfully obtains administrator access to server 14(i), or is timed out as described above, engineer 20(i) will have to send another request for a temporary password to computing device 16 in order to obtain administrator access to server 14(i). Further details of computing device 16 will now be provided in connection with FIG. 3.

Figure 3:
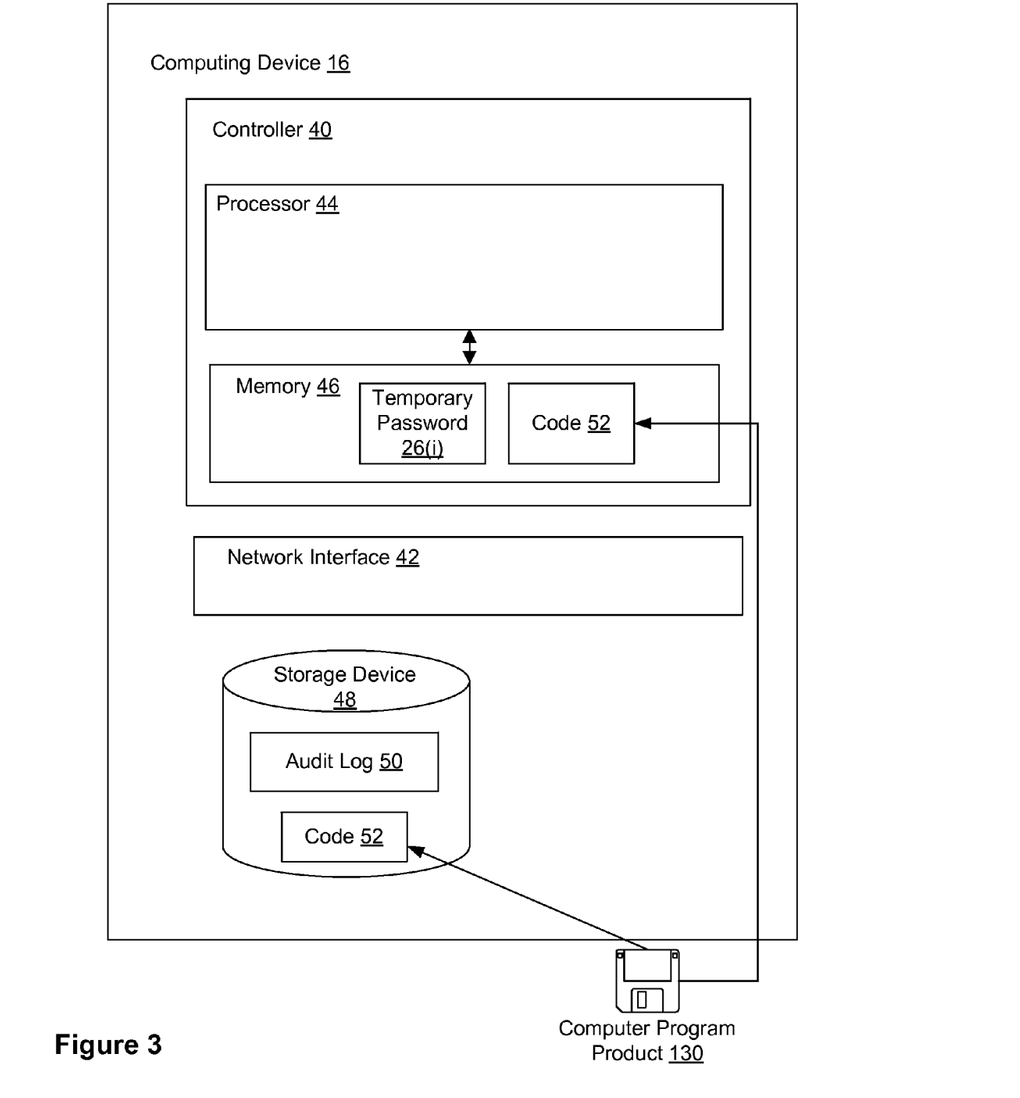
FIG. 3 is a block diagram illustrating an example computing device within the electronic environment shown in FIG. 1.

FIG. 3 illustrates computing device 16 in further detail. As illustrated in FIG. 3, computing device 16 includes a controller 40, which in turn includes a processor 44 and memory 46, a network interface 42, and a storage device 48.

Network interface circuitry 42 takes the form of an Ethernet card; in some arrangements, network interface circuitry 42 takes other forms including that of a wireless receiver or a token ring card, for example.

Memory 46 is configured to store code 52 from computer program product 130, which includes instructions for generating a temporary password 26(i), setting an administrator password of a server, and revealing temporary password 26(i) to a support engineer. Memory 46 is further configured to store temporary password 26(i) once generated. Memory 46 generally takes the form of, e.g., random access memory, although in some arrangements memory 46 includes flash memory or a non-volatile memory.

Processor 44 takes the form of, but is not limited to, Intel or AMD-based CPUs, and can include a single or multiple cores each running single or multiple threads. Processor 44 is coupled to memory 46 and is configured to execute instructions from code 52.

Storage device 48 includes non-volatile memory and takes the form of, but is not limited to, disk memory and/or solid-state memory. Storage drive 48 is configured to store code 52 and an audit log 50. Audit log 50 is described in detail in FIGS. 4 and 5.

Figure 4:
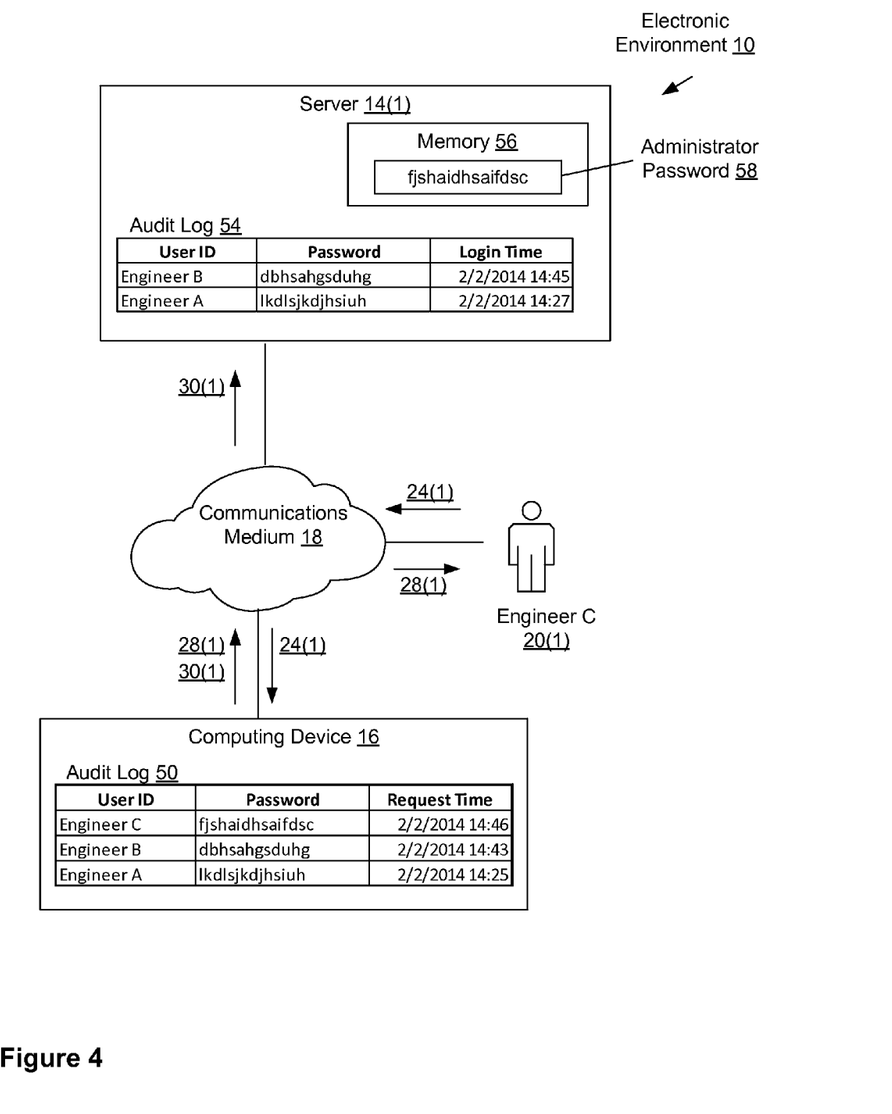
FIG. 4 is a block diagram further illustrating the electronic environment shown in FIG. 1.

FIG. 4 illustrates another perspective of example electronic environment 10, which includes a server 14(1), computing device 16, communications medium 18, and an engineer 20(1) having User ID value of Engineer C. Computing device 16 includes an audit log 50, as illustrated in FIG. 3.

Audit log 50 is configured to associate an engineer with the temporary password that computing device 16 generated in response to a request from that engineer. In some arrangements, audit log 50 takes the form of a database having fields of User ID, Password, and Request Time and entries having values of these fields. In other arrangements, however, audit log 50 can take the form of a spreadsheet, a text-based list, or the like.

As illustrated in FIG. 4, audit log 50 has existing entries for two engineers, Engineer A and Engineer B, who had previously requested administrator access to server 14(1). Audit log 50 records the User IDs, generated temporary passwords, and time at which a request for administrator access to server 14(1) was received for each of these engineers. FIG. 4 illustrates that computing device 16 received a request from Engineer A at 14:25 and generated the temporary password "lkdlsjkdjhsiuh", and also received a request from Engineer B at 14:43 and generated the temporary password "dbhsahgsduhg".

It should be understood that, as described in this example, audit log 50 concerns only requests to access server 14(1). In some arrangements, however, audit log 50 keeps track of passwords generated for the multiple servers of a SaaS system.

As further illustrated in FIG. 4, server 14(1) stores another audit log 54 that tracks information about which engineers acquired administrator access with what password. For example, FIG. 4 shows that Engineer A successfully logged into server 14(1) at 14:27 and Engineer B successfully logged into server 14(1) at 14:45 (each about 2 minutes after computing device 50 received the request for access).

When engineer 20(1) sends a request 24(1) to obtain administrator access to server 14(1), computing device creates a new entry in audit log 50 and stores the identifier of engineer 20(1) (e.g., "Engineer C"), the time at which computing device 16 received request 24(1) (e.g., 14:46 on 2/2/2014) in that new entry, and the password generated ("fjshaidhsaifdsc") upon receipt of request 24(1). As described previously, computing device 16 sends messages 28(1) and 30(1) to engineer 20(1) and server 14(1), respectively, containing the new password.

Upon receipt of message 30(1), server 14(1) changes administrator password 58 to that just generated and contained in message 30(1); server 14(1) stores administrator password 58 is stored in its memory 56. If engineer 20(1) logs into server 14(1) with this password ("fjshaidhsaifdsc"), then server 14(1) grants administrator access to engineer 20(1).

Figure 5:
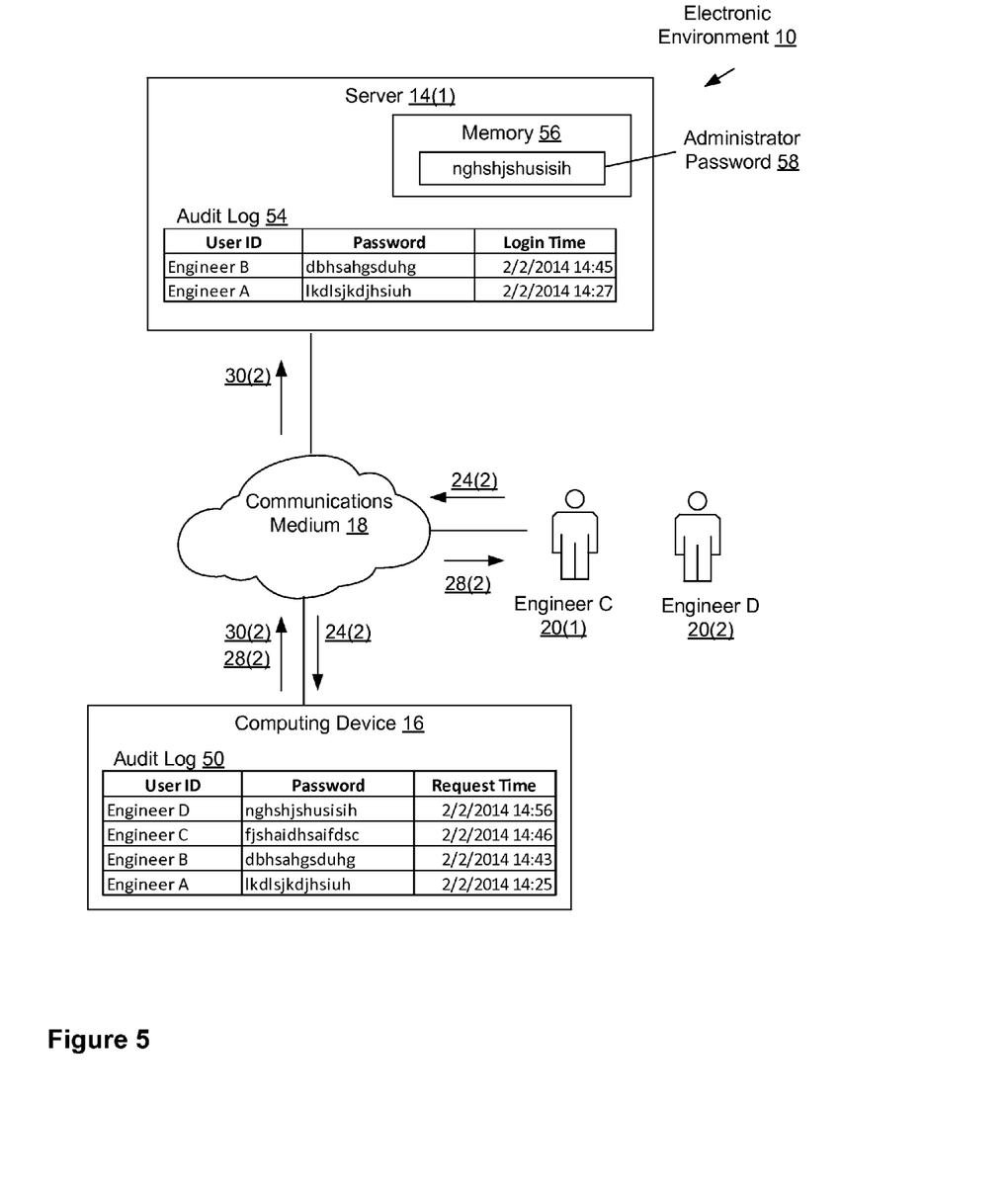
FIG. 5 is a block diagram further illustrating the electronic environment shown in FIG. 1.

FIG. 5 illustrates a further example scenario within example electronic environment 10 after administrator password 58 has been changed to the new password revealed to engineer 20(1). In this example, engineer 20(1)—the engineer with User ID "Engineer C"—has not logged into server 14(1) using the temporary password revealed by computing device 16 in message 28(1). In the meantime, another engineer 20(2), having user ID "Engineer D", sends a request 24(2) to computing device 16 for administrator access to server 14(1).

It should be understood that computing device 16 is configured to be informed of whether engineer 20(1) has acquired administrator access to server 14(1), as previously discussed, through a notification 36(1) from server 14(1). In some arrangements, computing device 16 may instead read audit log 54 on server 14(1) after a certain amount of time has passed to verify whether engineer 20(1) has acquired administrator access to server 14(1).

When computing device 16 receives request 24(2) and computing device 16 has verified that engineer 20(1) has not acquired administrator access to server 14(1), computing device 16 checks audit log 50 and computes how much time has passed since it has received request 24(1) from engineer 20(1). If enough time has passed (e.g., 10 minutes, 20 minutes, 5 minutes, or the like), then computing device 16 carries out the procedure described in FIG. 4: generating a new temporary password, sending messages 28(2) and 30(2) revealing the new password, and directing server 14(1) to change administrator password 58 to the new temporary password. In this case, engineer 20(1) will no longer be able to obtain administrator access with his/her temporary password, and will have to send a new request to gain administrator access. On the other hand, if not enough time has passed, then computing device 16 does not generate a new temporary password and sends engineer 20(2) message 28(2) notifying him/her that request 24(2) was denied.

Figure 6:
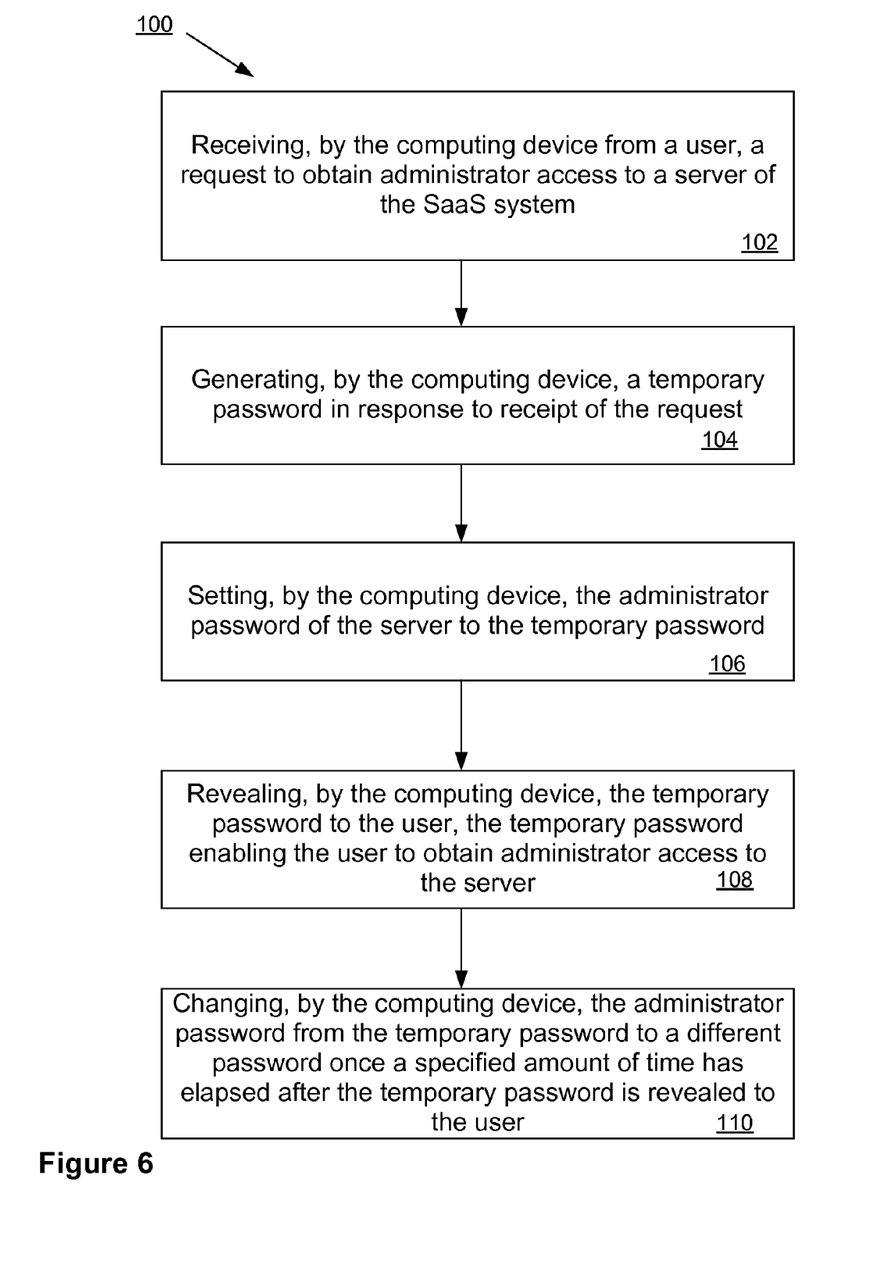
FIG. 6 is a flow chart illustrating an example method of carrying out the improved technique within the electronic environment shown in FIG. 1.

FIG. 6 illustrates a method 100 for carrying out the improved technique, including steps 102, 104, 106, 108, and 110. It should be understood that code 52 is configured to, when executed by computing device 16, cause computing device 16 to perform method 100. In step 102, a computing device, e.g., computing device 16 receives a request, e.g., request 24(1), to obtain administrator access to a server, e.g., server 14(1), of a SaaS system, e.g., SaaS system 12 from a user, e.g., engineer 20(1). In step 104, the computing device generates a temporary password, e.g., temporary password 26(i), in response to receipt of the request. In step 106, the computing device sets the administrator password of the server to the temporary password. In step 108, the computing device reveals the temporary password to the user, the temporary password enabling the user to obtain administrator access to the server. In step 110, the computing device changes the administrator password from the temporary password to a different password after the temporary password is revealed to the user once a specified amount of time has elapsed after the temporary password is revealed to the user.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to computing device 16, which is constructed and arranged to manage a software-as-a-service (SaaS) system. Some embodiments are directed to a process of operating a computing device configured to manage a SaaS system. Also, some embodiments are directed to a computer program product which enables computer logic to cause a computer to manage a SaaS system.

In some arrangements, computing device 16 is implemented by a set of processors or other types of control/processing circuitry running software. In such arrangements, the software instructions can be delivered, within computing device 16, either in the form of a computer program product 130 (see FIG. 3) or simply instructions on disk or in pre-loaded in memory 46 of computing device 16, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of operating a computing device configured to manage a software-as-a-service (SaaS) system, the method comprising:
    receiving, by the computing device from a user commencing a support operation on a server of the SaaS system, a request to obtain administrator access to the server of the SaaS system;
    generating, by the computing device, a temporary password in response to receipt of the request;
    setting, by the computing device, an administrator password of the server to the temporary password;
    revealing, by the computing device, the temporary password to the user, the temporary password enabling the user to obtain administrator access to the server and to perform support operations thereon, wherein revealing the temporary password to the user includes causing the temporary password to be displayed in a display device of a user computer; and
    changing, by the computing device, the administrator password from the temporary password to a different password once a specified amount of time has elapsed after the temporary password is revealed to the user;
    wherein the request to obtain administrator access to the server includes a user identifier that identifies the user from whom the request was received; and
    wherein the method further comprises writing the user identifier and the temporary password into an entry in an audit log stored in a storage device of the computing device upon the generation of the temporary password in order to strengthen accountability in the support operations;

wherein setting the administrator password of the server to the temporary password includes:
  sending a message from the computing device to the server of the SaaS system instructing that the administrator password of the server of the SaaS system be set to the temporary password and
  after sending the message, receiving, by the computing device, another message from the server of the SaaS system confirming that the administrator password of the server of the SaaS system has been set to the temporary password; and
wherein the temporary password is displayed on the display device in response to receipt, by the computing device, of the other message confirming that the administrator password of the server of the SaaS system has been set to the temporary password.

2. A method as in claim 1, further comprising writing the user identifier and the temporary password into an entry in another audit log stored in a storage device of the server when the user obtains administrator access to the server, the other audit log indicating a correlation between user activity on the server with the user identity based on the temporary password used by the user to obtain administrator access to the server.

3. A method as in claim 2, further comprising:
  writing timestamps in the other audit log, each timestamp indicating a time at which a user activity was performed in the server; and
  verifying that another user sharing administrator access to the server with the user performed a particular activity in the server based on the timestamps written to the other audit log.

4. A method as in claim 1, further comprising, upon receipt of a request to obtain administrator access to the server of the SaaS system from another user prior to the user having commenced the support operation on the server, performing a conflict assessment operation that denies the generation of the temporary password for the other user once the specified amount of time has not passed upon the receipt of the request to obtain administrator access to the server of the SaaS system from the other user.

5. A method as in claim 1, further comprising providing to the user computer operated by the user a software program configured to run in a browser of the user computer;
  wherein the user sends the request to obtain administrator access to the server of the SaaS system to the computing device via the software program and
  wherein revealing the temporary password to the user further includes causing the temporary password to be displayed in a browser window of the browser on the display device of the user computer.

6. A method as in claim 1, wherein revealing the temporary password to the user includes enclosing the temporary password within an email message addressed to the user.

7. A method as in claim 1, wherein setting the administrator password to the temporary password includes:
  creating a temporary administrator account on the server that is accessed using the administrator password; and
  wherein changing the administrator password from the temporary password to a different password includes:
    removing the temporary administrator account from the server.

8. A method as in claim 1, wherein generating the temporary password includes invoking a random number generator, the random number generator outputting a specified number of ASCII characters.

9. An apparatus constructed and arranged to manage a software-as-a-service (SaaS) system, the apparatus comprising:
  a network interface; and
  a controller including controlling circuitry, the controlling circuitry being constructed and arranged to:
    receive, from a user over the network interface commencing a support operation on a server of the SaaS system, a request to obtain administrator access to the server of the SaaS system;
    generate a temporary password in response to receipt of the request;
    set the administrator password of the server to the temporary password;
    reveal the temporary password to the user, the temporary password enabling the user to obtain administrator access to the server and to perform support operations thereon, wherein when the controlling circuitry reveals the temporary password to the user the controlling circuitry causes the temporary password to be displayed in a display device of a user computer; and
    change the administrator password from the temporary password to a different password once a specified amount of time has elapsed after the temporary password is revealed to the user;
  wherein the request to obtain administrator access to the server includes a user identifier that identifies the user from whom the request was received; and
  wherein the controlling circuitry is further constructed and arranged to write the user identifier and the temporary password into an entry in an audit log stored in a storage device of the apparatus upon the generation of the temporary password in order to strengthen accountability in the support operations;
  wherein the controlling circuitry constructed and arranged to set the administrator password of the server to the temporary password is further constructed and arranged to:
    send a message across the network interface to the server of the SaaS system instructing that the administrator password of the server of the SaaS system be set to the temporary password and
    after sending the message, receive, by the control circuitry, another message from the server of the SaaS system confirming that the administrator password of the server of the SaaS system has been set to the temporary password; and
  wherein the temporary password is displayed on the display device in response to receipt, by the control circuitry, of the other message confirming that the administrator password of the server of the SaaS system has been set to the temporary password.

10. An apparatus as in claim 9, wherein the controlling circuitry is further constructed and arranged to write the user identifier and the temporary password into an entry in another audit log stored in a storage device of the server when the user obtains administrator access to the server, the other audit log enabling a correlation between user activity on the server with the user identity based on the temporary password used by the user to obtain administrator access to the server.

11. An apparatus as in claim 10, wherein the controlling circuitry is further constructed and arranged to:
  write timestamps in the other audit log, each timestamp indicating a time at which a user activity was performed in the server; and verify that another user sharing administrator access to the server with the user performed a particular activity in the server based on the timestamps written to the other audit log.

12. An apparatus as in claim 9, wherein the controlling circuitry is further constructed and arranged to, upon receipt of a request to obtain administrator access to the server of the SaaS system from another user prior to the user having commenced the support operation on the server, performing a conflict assessment operation that denies the generation of the temporary password for the other user once the specified amount of time has not passed upon the receipt of the request to obtain administrator access to the server of the SaaS system from the other user.

13. An apparatus as in claim 9, wherein the controlling circuitry is further constructed and arranged to provide to a user computer operated by the user a software program configured to run in a browser of the user computer;
wherein the user sends the request to obtain administrator access to the server of the SaaS system to the computing device via the software program and
wherein the controlling circuitry constructed and arranged to reveal the temporary password to the user is further constructed and arranged to cause the temporary password to be displayed in a browser window of the browser on the display device of the user computer.

14. An apparatus as in claim 9, wherein the controlling circuitry constructed and arranged to reveal the temporary password to the user is further constructed and arranged to enclose the temporary password within an email message addressed to the user.

15. A computer program product having a non-transitory, computer-readable storage medium which stores code, which when executed by a computing device configured to manage a software-as-a-service (SaaS) system, causes the computing device to:
receive, from a user commencing a support operation on a server of the SaaS system, a request to obtain administrator access to the server of the SaaS system;
generate a temporary password in response to receipt of the request;
set the administrator password of the server to the temporary password;
reveal the temporary password to the user, the temporary password enabling the user to obtain administrator access to the server and to perform support operations thereon, wherein revealing the temporary password to the user includes causing the temporary password to be displayed in a display device of a user computer; and
change the administrator password from the temporary password to a different password once a specified amount of time has elapsed after the temporary password is revealed to the user;
wherein the request to obtain administrator access to the server includes a user identifier that identifies the user from whom the request was received; and
wherein the code further causes the computing device to write the user identifier and the temporary password into an entry in an audit log stored in a storage device of the computing device upon the generation of the temporary password in order to strengthen accountability in the support operations;
wherein setting the administrator password of the server to the temporary password includes:
sending a message from the computing device to the server of the SaaS system instructing that the administrator password of the server of the SaaS system be set to the temporary password and
after sending the message, receiving, by the computing device, another message from the server of the SaaS system confirming that the administrator password of the server of the SaaS system has been set to the temporary password; and
wherein the temporary password is displayed on the display device in response to receipt, by the computing device, of the other message confirming that the administrator password of the server of the SaaS system has been set to the temporary password.

* * * * *